(12) United States Patent
Chun et al.

(10) Patent No.: US 12,489,687 B2
(45) Date of Patent: Dec. 2, 2025

(54) APPARATUS AND METHOD FOR INTERFACING EBC FRAMEWORK WITH ML FRAMEWORK

(71) Applicant: ELECTRONICS AND TELECOMMUNICATIONS RESEARCH INSTITUTE, Daejeon (KR)

(72) Inventors: Young Ae Chun, Daejeon (KR); Ho Jin Park, Daejeon (KR); Hark Jin Lee, Daejeon (KR); Seung Woog Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/652,910

(22) Filed: May 2, 2024

(65) Prior Publication Data
US 2025/0080430 A1    Mar. 6, 2025

(30) Foreign Application Priority Data

Sep. 1, 2023  (KR) .................. 10-2023-0116290
Jan. 10, 2024  (KR) .................. 10-2024-0004438

(51) Int. Cl.
*H04L 41/16*   (2022.01)
*G06N 3/04*    (2023.01)
*G06N 3/08*    (2023.01)

(52) U.S. Cl.
CPC ............... *H04L 41/16* (2013.01); *G06N 3/08* (2013.01); *G06N 3/04* (2013.01)

(58) Field of Classification Search
CPC ............ H04L 41/16; G06N 3/08; G06N 3/04
See application file for complete search history.

(56) References Cited

U.S. PATENT DOCUMENTS

| | | |
|---|---|---|
| 11,614,989 B2 | 3/2023 | Hwang |
| 11,711,795 B2 | 7/2023 | Shin |
| 2014/0156806 A1* | 6/2014 | Karpistsenko ......... G06Q 10/06 709/219 |
| 2021/0342441 A1* | 11/2021 | Ross ..................... G06F 21/316 |
| 2023/0388332 A1* | 11/2023 | Cunningham ........ G06F 21/552 |
| 2024/0356817 A1* | 10/2024 | Wang .................... H04W 28/18 |

FOREIGN PATENT DOCUMENTS

KR   10-2018-0097128 A    8/2018

* cited by examiner

*Primary Examiner* — Minh Chau Nguyen
(74) *Attorney, Agent, or Firm* — LRK PATENT LAW FIRM (57) ABSTRACT

The present invention relates to an apparatus and method for interfacing an equipment behavior catalogue (EBC) framework with a machine learning (ML) framework, and the apparatus includes an EBC framework including an EBC storage and a set of equipment instance models, and an ML framework interfaced with the EBC framework and including a collection of tools and libraries that support development and learning of ML models.

20 Claims, 3 Drawing Sheets

FIG.2

APPARATUS AND METHOD FOR INTERFACING EBC FRAMEWORK WITH ML FRAMEWORK

CROSS-REFERENCE TO RELATED APPLICATIONS

This application claims priority to and the benefit of Korean Patent Applications No. 10-2023-0116290, filed on Sep. 1, 2023, and No. 10-2024-0004438, filed on Jan. 10, 2024, the disclosure of which is incorporated herein by reference in its entirety.

BACKGROUND

1. Field of the Invention

The present invention relates to an apparatus and method for interfacing an equipment behavior catalogue (EBC) framework with a machine learning (ML) framework.

2. Description of Related Art

Since the equipment catalogues used in the simulation of the existing virtual production systems include only equipment property information, there were limitations in accurately predicting the productivity and efficiency of smart virtual factories built with virtual production systems.

Accordingly, in order to accurately predict the productivity and efficiency of a smart virtual factory, it is necessary for an equipment behavior catalogue (EBC) that includes not only the equipment properties but also the equipment behaviors such as equipment operation conditions, state transitions, operation results, etc.

Further, data collected at specific points of interest within a product life cycle may be used to train and improve machine learning (ML) models.

Such ML models may be applied to systems or production lines to enable automation and optimization, reduce human intervention, improve operational efficiency, and make more accurate decisions based on data.

When the ML model is added to equipment or a specific component of the equipment is replaced with the ML model, in order to simulate the overall performance of the equipment including the ML model, an EBC for the equipment including the ML model should be built, and an equipment instance model including the ML model should be built based on the EBC.

Accordingly, an interface is needed to facilitate interaction between an EBC framework and an ML framework during the development and mutual execution of an EBC and an ML model.

SUMMARY OF THE INVENTION

The present invention is directed to providing an apparatus and method for interfacing an equipment behavior catalogue (EBC) framework with a machine learning (ML) framework, which support an EBC to include an ML model by specifying an interface between an EBC framework and an ML framework.

According to an aspect of the present invention, there is provided an apparatus for interfacing an EBC framework with a ML framework, which includes an EBC framework including an EBC storage and a set of equipment instance models, and an ML framework interfaced with the EBC framework and including a collection of tools and libraries that support development and learning of ML models.

An EBC template and one or more EBC items that are generated using the EBC template may be stored in the EBC storage.

The ML framework may perform a function for simplifying the generation, learning, evaluation, and application of the ML models and supporting a developer to more easily configure and manage the models.

ML models for equipment elements developed by an EBC provider and EBC items for each ML model may be registered in the EBC storage.

When an EBC user selects an EBC item including a specific ML model from the EBC storage, the EBC framework may build an equipment instance model for the EBC item.

The EBC framework may repeat equipment performance evaluation to select an optimal ML model.

When an EBC provider determines that the ML model has to be added to equipment or a specific component of the equipment has to be replaced with the ML model, the EBC framework may develop a necessary ML model through an interface between an EBC template, EBC items, and the ML framework.

In order to develop the ML model, the EBC framework may transmit the ML framework and library metadata that are specified in the EBC template to a corresponding ML framework, transmit dataset metadata and preprocessing metadata specified in the EBC template to the ML framework, and transmit training and model metadata specified in the EBC template to the ML framework.

In order to develop the ML model, the ML framework may import a library corresponding to the framework metadata from the EBC framework, receive the dataset metadata from the EBC framework, load a corresponding dataset, perform preprocessing on the dataset, receive the training and model data from the EBC framework, develop the ML model through model architecture definition, compiling, and learning, store the developed ML model, and transmit the developed ML model metadata as the EBC item of the EBC framework.

The EBC framework may build an equipment instance model by receiving an EBC item including a specific ML model specified in the EBC storage, which is selected by an EBC user, and execute an embedded ML model on the equipment instance model through an interface of the ML framework.

In order to execute the embedded ML model on the equipment instance model, the EBC framework may transmit ML model metadata specified in the equipment instance model and data input and output specifications to the ML framework, and the ML framework may load the stored ML model, perform inference using the imported ML model, and transmit inference result metadata to the equipment instance model.

In the equipment instance model, a communication protocol may be specified to facilitate data exchange between ML frameworks, wherein the communication protocol may include error handling and reporting, security and access control, and monitoring and maintenance functions.

The EBC framework may develop a new ML model through retraining, fine-tuning, or data preprocessing improvement of the ML models through an interface with the ML framework.

According to another aspect of the present invention, there is provided a method of interfacing an EBC framework with an ML framework, which includes transmitting, by an EBC framework of an apparatus for interfacing the EBC framework with an ML framework, the ML framework and library metadata that are specified in the EBC template to a corresponding ML framework in order to develop ML models, wherein the apparatus includes an EBC framework including an EBC storage and a set of equipment instance models and an ML framework interfaced with the EBC framework and including a collection of tools and libraries that support the development and learning of ML models, transmitting, by the EBC framework, dataset metadata and preprocessing metadata specified in the EBC template to the ML framework, and transmitting, by the EBC framework, training and model metadata specified in the EBC template to the ML framework.

When an EBC user selects an EBC item including a specific ML model from the EBC storage, the EBC framework may build an equipment instance model for the EBC item. In order to develop the ML model, the ML framework may import a library corresponding to the framework metadata from the EBC framework, receive the dataset metadata from the EBC framework, load a corresponding dataset, perform preprocessing on the dataset, receive the training and model data from the EBC framework, develop the ML model through model architecture definition, compiling, and learning, store the developed ML model, and transmit the developed ML model metadata as the EBC item of the EBC framework.

The EBC framework may build an equipment instance model by receiving an EBC item including a specific ML model specified in the EBC storage, which is selected by an EBC user, and execute an embedded ML model on the equipment instance model through an interface of the ML framework.

In order to execute the embedded ML model on the equipment instance model, the EBC framework may transmit ML model metadata specified in the equipment instance model and data input and output specifications to the ML framework, and the ML framework may load the stored ML model, perform inference using the imported ML model, and transmit inference result metadata to the equipment instance model.

In the equipment instance model, a communication protocol may be specified to facilitate data exchange between ML frameworks, wherein the communication protocol may include error handling and reporting, security and access control, and monitoring and maintenance functions.

The EBC framework may develop a new ML model through retraining, fine-tuning, or data preprocessing improvement of the ML models through an interface with the ML framework.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, an apparatus and method for interfacing an equipment behavior catalogue (EBC) framework with a machine learning (ML) framework according to embodiments of the present invention will be described.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked," "coupled," or "connected" to another component, it is understood that not only a direct connection relationship but also an indirect connection relationship through an intermediate component may also be included. In addition, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

Hereinafter, in embodiments of the present invention, ML is a process that can predict future results by learning with existing data using an algorithm rather than procedural coding. Further, a ML framework is a collection of tools and libraries that support the development and learning of ML models. Further, an ML model is a mathematical structure that generates inferences or predictions on the basis of input data.

For reference, in the case of supervised learning, an ML model is a result of a learning or ML algorithm. For example, when a univariate linear function (y=w0+w1(x)) is learned using linear regression, a resulting model may be y=3+7(x).

Further, hereinafter, in the present embodiment, API is an abbreviation for application programming interface, REST is an abbreviation for representative state transfer, RPC is an abbreviation for remote procedure call, UML is an abbreviation for unified modeling language, XML is an abbreviation for extensible markup language, and PDCA is an abbreviation for plan-execute-check-act.

Hereinafter, by adding an ML model to equipment or replacing a specific component of the equipment with the ML model according to the present invention, the overall performance of the equipment can be improved while reducing costs.

Figure 1:
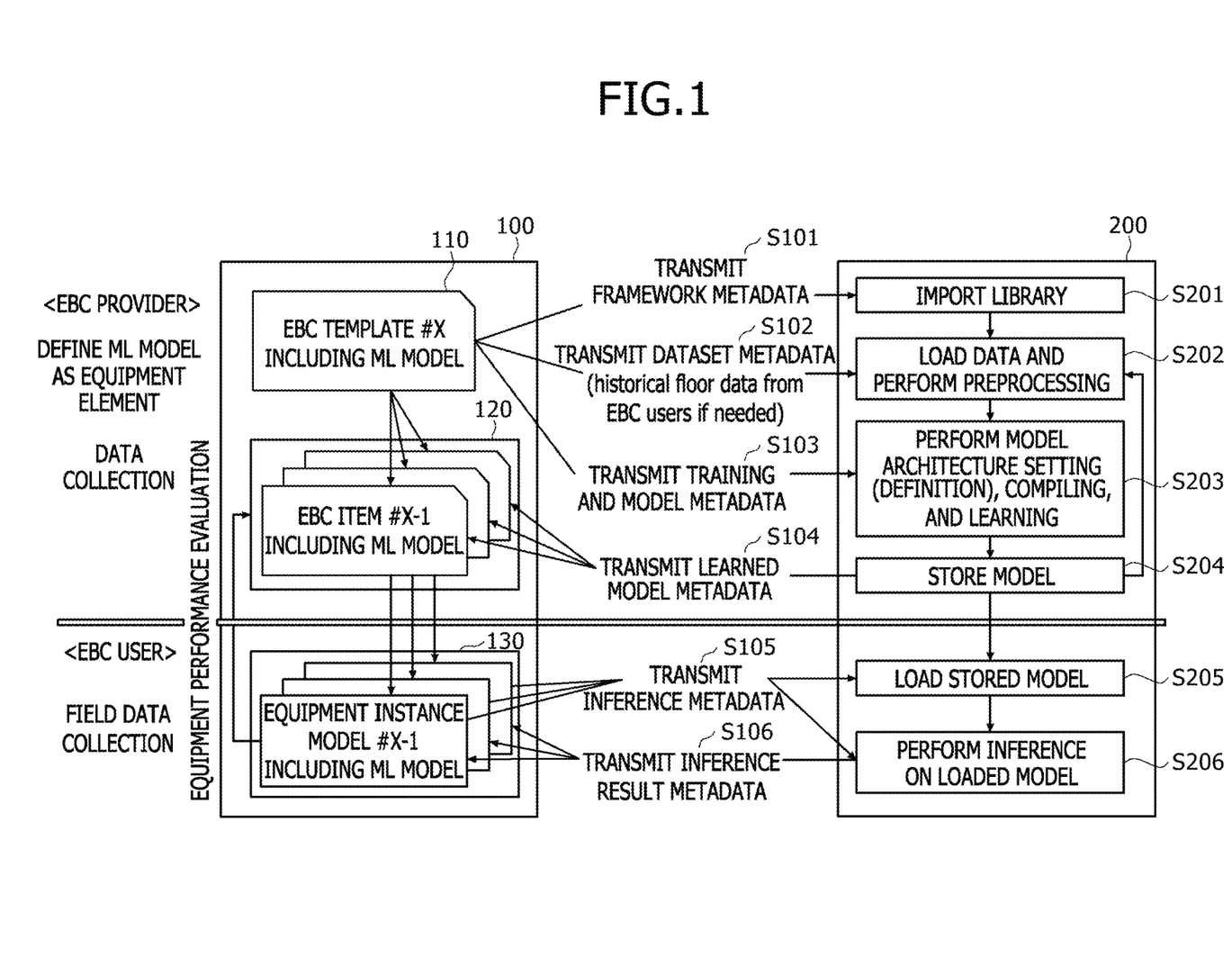
FIG. 1 is an exemplary diagram illustrating the schematic configuration of an apparatus for interfacing an equipment behavior catalogue (EBC) framework with a machine learning (ML) framework according to an embodiment of the present invention.

FIG. 1 is an exemplary diagram illustrating the schematic configuration of an apparatus for interfacing an EBC framework with an ML framework according to an embodiment of the present invention, which corresponds to an interface for an EBC for embedding an ML model. That is, the apparatus supports an EBC to include an ML model.

Referring to FIG. 1, an EBC framework 100 includes an EBC storage (not illustrated) and a set of equipment instance models 130.

Here, an EBC is a group consisting of one EBC template 110 and EBC items 120 that are generated using the EBC template 110.

An ML framework 200 is a collection of tools and libraries that support the development and learning of ML models.

The ML framework 200 simplifies the generation, learning, evaluation, and application of models and supports developers to more easily configure and manage models. An EBC provider and an EBC user generally follow stages below to develop and use EBCs and ML models.

The EBC provider defines equipment elements as ML models, collects data, prepares EBC templates, and then registers the ML models, data, and EBC templates in the EBC storage.
  (1) The EBC provider develops ML models for equipment elements, prepares EBC items for each ML model, and then registers the ML models and EBC items in the EBC storage.
  (2) The EBC user selects an EBC item including a specific ML model from the EBC storage, and builds an equipment instance model for the selected EBC item. The EBC user repeats equipment performance evaluation to select an optimal ML model during simulation.
  (3) Lastly, the EBC user develops a new version of an ML model when there is additional collected field data, registers EBC items in the new ML model, builds an equipment instance model using the new ML model, and then evaluates the performance of the equipment during simulation.

(Interface when Preparing EBC and ML Model)

The EBC provider determines that an ML model has to be added to equipment or a specific component of the equipment has to be replaced with the ML model. The EBC provider and the EBC user develop a necessary ML model using a specified ML framework.

At this stage of ML model development, the interface between the EBC template/EBC items and the ML framework should include the following interactions.

The ML framework and library metadata that are specified in the EBC template 110 are transmitted to a corresponding ML framework 200 (S101).

The ML framework 200 imports a corresponding library (S201).

Dataset metadata and preprocessing metadata specified in the EBC template 110 are transmitted to the ML framework (S102).

The ML framework 200 loads a dataset and performs data preprocessing (S202).

Training and model metadata specified in the EBC template are transmitted to the ML framework 200 (S103).

Then, the ML framework 200 defines a model architecture, defines the model architecture, performs learning (S203), and then stores models (S204).

When necessary, the ML framework 200 repeats the processes (S202 to S204), and transmits the developed ML model metadata to the EBC items (S104).

Accordingly, the ML model metadata is stored in each EBC item 120.

The EBC provider prepares the EBC template and the EBC items including the ML models together with other equipment elements and registers the EBC template and the EBC items in the EBC storage (not illustrated).

(Interface for Building Equipment Instance Model Using ML Models)

The EBC user builds an equipment instance model by selecting an EBC item including a specific ML model from the EBC storage (not illustrated) as illustrated in FIG. 1, and executes an embedded ML model on the equipment instance model through the interface of the ML framework 200.

In order to execute the embedded ML model on the equipment instance model, the interface between an equipment instance model 130 and the ML framework 200 should include the following interactions.

The ML model metadata specified in the equipment instance model 130 and data input and output specifications are transmitted to the ML framework 200 (S105).

The ML framework 200 loads the stored model (S205), performs inference on the basis of the imported model (S206), and transmits inference result metadata to the equipment instance model 130 (S106).

For reference, the format and architecture of the data input required for the ML model to make predictions are the expected format and structure of an output result which will be generated by the ML model. Further, a method in which the ML model embedded in the equipment instance model interacts with the ML framework should be specified. The method includes determining whether to include the ML model in a simulation codebase or access the ML model as an external service. A communication protocol specified in the equipment instance model 130 is utilized to facilitate data exchange between the equipment instance model 130 and the ML framework 200. Further, the communication protocol may include RPC, REST API, message queues, or other appropriate communication methods. Further, the interface between the EBC framework and the ML framework may include interactions such as error handling and reporting, security and access control, and monitoring and maintenance.

(New EBC Items and Interface for ML Model Development)

When collected field data is sufficient, the collected field data may be used to develop a new ML model through retraining, fine-tuning, or data preprocessing improvement of the model using the interface described above. A new EBC item to which the model is applied may be additionally registered in the EBC storage (not illustrated). An equipment instance model for the EBC item may be used to improve system performance.

(Procedure for Building EBC Template Using ML Model)

The EBC template and the EBC item should include the following information to embed the ML model as a part of the equipment. The EBC template and the EBC item may include (1) dataset metadata, such as a location, a format, and a structure of the data, (2) training and model metadata, such as an architecture and configuration of the model, hyperparameters used during training, a training period, the evaluation metrics, and even a model version, and (3) inference metadata, such as a distribution environment, inference server settings, an input data format, an output format, etc. In order to embed an ML model into an EBC template, the following measures may be taken at each stage of a procedure for building a specified EBC template.

(First Example—Using ML Model as Alternative to EBC Input)

When an EBC is built, input parameters of the EBC, such as a delay time and an arrival rate, are defined as causal rules, modeled as univariate random variables, or modeled as a random vector with a multivariate probability distribution, on the basis of knowledge of actual equipment.

However, when ideal assumptions and constraints should be applied to equipment or when the understanding of actual equipment is low, a more accurate EBC may be built by replacing a data-based ML model with input parameters.

(Second Example—ML Model as Part of EBC Operation)

When a specific component of equipment is very complex so that a very high level of detail is required and it cannot necessarily be abstracted into a single value (or distribution), behavior of the equipment may be roughly estimated by replacing a data-based ML model.

For example, in the case of an ML model that contributes to forming patterns on a semiconductor chip by approximating the operation of etching equipment that involves complex interactions such as chemical reactions, surface interactions, gas flows, etc., by collecting data under various operating conditions and correlating input variables (e.g., temperature, pressure, time, etc.) with output variables (e.g., pattern accuracy, process time, etc.), the ML model may learn relationships and predict the behavior of equipment.

(Third Example—ML Model Used as One Component in Complex Equipment)

An ML model may be added as a component of equipment to improve the performance of the equipment and reduce costs.

For example, the ML model may be applied to quality inspection equipment equipped with ML models for surface defect inspection, thickness defect inspection, etc., or to material removal equipment equipped with ML models to determine when to replace a tool, optimal parameter values, etc.

(Fourth Example—UML State Chart for Example of Process Optimization of Material Removal Equipment Using ML Model)

Figure 2:
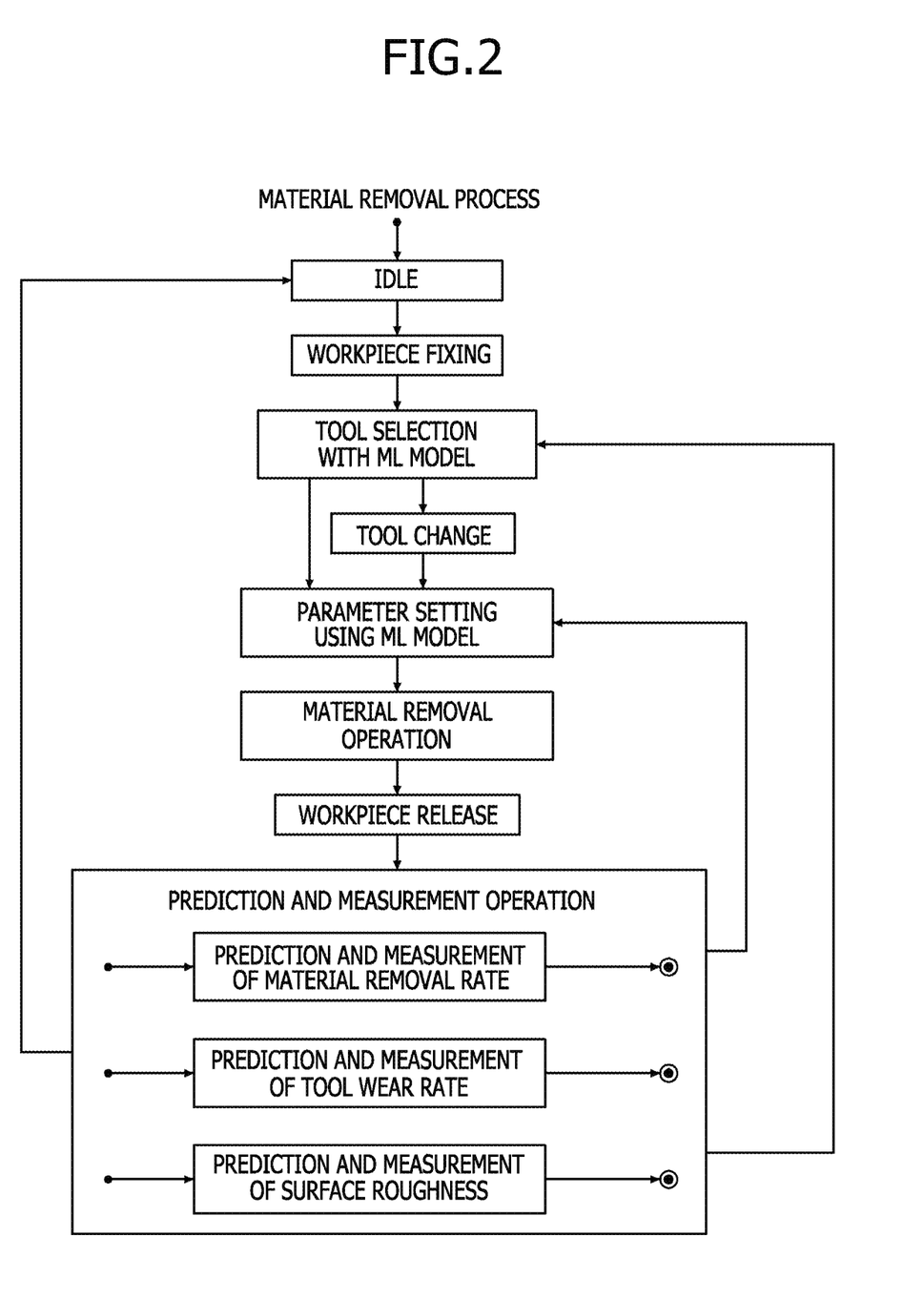
FIG. 2 is an exemplary diagram illustrating a unified modeling language (UML) state chart for selecting the most appropriate tool and optimized process parameters on the basis of the apparatus described in FIG. 1.

FIG. 2 is an exemplary diagram illustrating a UML state chart for selecting the most appropriate tool and optimized process parameters on the basis of the apparatus described in FIG. 1, where the important factors are a material removal rate, a tool wear rate, and a surface roughness. Process optimization means minimizing a tool wear rate while maximizing a material removal rate, and producing an optimal surface roughness.

There are eight normal states (e.g., Idle, Workpiece_Fixing, Tool_Selection_with_ML, Tool_change, Parameter_Setting_with_ML, Material_Removal_Operation, Workpiece_Release, Prediction_Measurement_Operation with sub-states of Material_Removal_Rate_PnM, Tool_Wear_Rate_PnM, and Surface_Roughness_PnM).

Among the eight states, the "tool selection with ML model" (Tool_with_ML) state and the "parameter setting with ML model" (Parameter_Setting_with_ML) state are states in which an ML model is included.

Further, the ML model may also be used in the sub-states of the "prediction and measurement of material removal rate" (Material_Removal_Rate_PnM), the "tool wear rate prediction and measurement" (Tool_Wear_Rate_PnM) state, and the "surface roughness prediction and measurement" (Surface_Roughness_PnM) of the "prediction and measurement operation" (Prediction_Measurement_Operation) state.

Detailed operational descriptions for the eight normal states are as follows.

Idle (Idle) state: After power of equipment is turned on, the equipment enters an "idle" state.

Workpiece fixing (Workpiece_Fixing) state: A workpiece is fixed in a correct position.

Tool selection using ML model (Tool_Selection_with_ML) state: An ML model is used to determine whether a tool should be replaced (changed) using input data such as process parameters, material properties, and tool properties.

Inputs:
  a) Process Parameters: Process setting parameters, such as a cutting speed, a cutting depth, a feed speed, a grinding wheel speed, a grinding depth, etc., may be used as input to the model.
  b) Material Properties: Material properties and property information of a material to be processed may be used as input to the model.
  c) Tool Properties: A shape, a material, and wear characteristics of a tool used may also be used as input to the model.

Outputs:
  a) The states of the tool are classified into classes such as a "normal" state and a "worn" tool state under specific conditions.

Tool change (Tool_Change) state: When it is determined that the tool has to be changed, the tool change is performed.

Parameter setting with ML model (Parameter_Setting_with_ML) state: An ML model is used to determine parameter values corresponding to process optimal conditions and determine tool properties using input data such as process parameters, material properties, and tool properties.

Inputs:
  a) Process parameters: Process setting parameters, such as a cutting speed, a cutting depth, a feed speed, a grinding wheel speed, a grinding depth, etc., may be used as input to the model.
  b) Material properties: Material properties and property information of a material to be processed may be used as input to the model.
  c) Tool properties: A shape, a material, and wear characteristics of a tool used may also be used as input to the model.
Outputs:
  a) Process optimization conditions: This model may recommend conditions or process parameter combinations that minimize the tool wear rate and the surface roughness while achieving optimal material removal rates.
  Material removal operation (Material_Removal_Operation) state: A material removal process is performed under process optimization conditions.
  Workpiece release (Workpiece_Release) state: Whether the material removal process is completed is determined.
  Prediction and measurement operation (Prediction_Measurement_Operation) state: The material removal rate, the tool wear rate, and the surface roughness are measured or predicted after the material removal process is completed.

Detailed operational descriptions of the sub-states of the measurement operation state are as follows.
  Prediction and measurement of material removal rate: The material removal rate is calculated using the process parameters or predicted by the ML model.
  a) Cutting process: A cutting speed, a cutting depth, a feed speed, etc.
  b) Grinding process: A grinding wheel speed, a feed speed, a cutting depth, etc.
  c) Discharge machining: A discharge current, a discharge frequency, a discharge time, etc.
  Prediction and measurement of tool wear rate: The material removal rate is calculated using the process parameters or predicted by the ML model.
  a) Wear rate: This model may provide as output an estimate of the tool wear rate for a given input.
  Prediction and measurement of surface roughness: The surface roughness is calculated using the process parameters or predicted by the ML model.

(Fifth Example—Procedure for Selecting Optimal ML Model)

Figure 3:
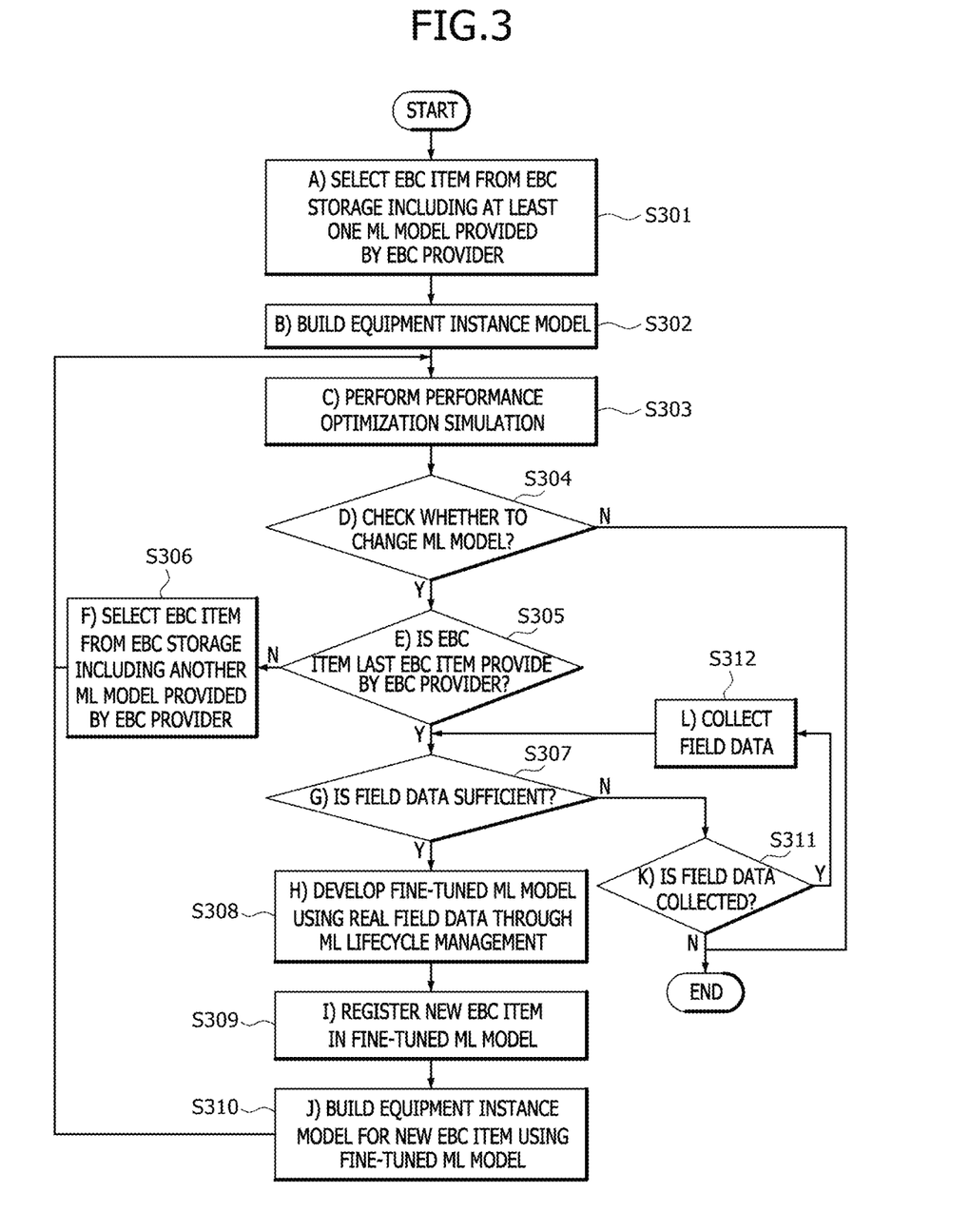
FIG. 3 is a flowchart illustrating an ML model selection procedure in a plan-execute-check-act (PDCA) cycle on the basis of the apparatus described in FIG. 1.

FIG. 3 is a flowchart illustrating an ML model selection procedure in a PDCA cycle on the basis of the apparatus described in FIG. 1, and illustrates the ML model selection procedure for an EBC when building a virtual production system.

The EBC user or the EBC framework 100 may select an ML model provided by the EBC provider from the EBC storage to evaluate the performance of the virtual production system. When necessary, the EBC user may select another ML model from the EBC storage or select an optimized ML model using real field data through ML lifecycle management.

Referring to FIG. 3, when the EBC user or the EBC framework 100 selects an EBC item from the EBC storage that includes at least one ML model provided by the EBC provider (S301), an equipment instance model is built (S302), a performance optimization simulation is performed (S303), and whether the ML model is changed is checked (S304), and when it is checked that the ML model is changed (Y in S304), whether the selected EBC item is the last EBC item provided by the EBC provider is checked (S305).

When it is checked that the EBC item is not the last EBC item provided by the EBC provider (N in S305), an EBC item is selected from the EBC storage that includes another ML model provided by the EBC provider (S306), and when it is checked that the EBC item is the last EBC item provided by the EBC provider (Y in S305), whether field data is sufficient is checked (S307).

When it is checked that the EBC item is the last EBC item provided by the EBC provider and the data collected in the field is sufficient (Y in S307), a fine-tuned ML model is developed using real field data through ML lifecycle management (S308), a new EBC item is registered in the fine-tuned ML model (S309), and an equipment instance model for the new EBC item is built using the fine-tuned ML model (S310).

Meanwhile, when it is checked that the EBC item is the last EBC item provided by the EBC provider and the data collected in the field is not sufficient (N in S307), whether the field data is collected is checked (S311), and when it is checked that the field data is collected, the field data is collected until the field data is sufficient (S312), and when it is checked that no field data is collected, the procedure ends.

(Example of EBC Template Including ML Model)

An EBC template including an ML model may include property set information, behavior information, and external interaction information.

Here, the property set may include a framework, a learning algorithm, a model file, a data set, a framework connection method, etc.

Further, the ML model may be described and expressed as states and/or behavioral elements of state transitions, such as transition conditions, external interaction triggers, variables/parameters, etc., and the behavior information may include a model identification, a model name, an input data set, output data, a prediction function, etc.

According to an aspect of the present invention, the present invention can support an EBC to include an ML model by specifying an interface between an EBC framework and an ML framework.

While the present invention has been described with reference to embodiment illustrated in the accompanying drawings, the embodiment should be considered in a descriptive sense only, and it should be understood by those skilled in the art that various alterations and equivalent other embodiments may be made.

Therefore, the scope of the present invention should be defined by only the following claims.

What is claimed is:

1. An apparatus for interfacing an equipment behavior catalogue (EBC) framework with a machine learning (ML) framework, the apparatus comprising:
   a processor; and a memory storing instructions which, when executed by the processor, cause the processor to implement:
   an EBC framework including an EBC storage and a set of equipment instance models; and
   an ML framework interfaced with the EBC framework and including a collection of tools and libraries that support development and learning of ML models.

2. The apparatus of claim 1, wherein, when an EBC provider determines that the ML model has to be added to equipment or a specific component of the equipment has to be replaced with the ML model, the EBC framework develops a necessary ML model through an interface between an EBC template, EBC items, and the ML framework.

3. The apparatus of claim 2, wherein, in order to develop the ML model, the EBC framework transmits the ML framework and library metadata that are specified in the EBC template to a corresponding ML framework, transmits dataset metadata and preprocessing metadata specified in the EBC template to the ML framework, and transmits training and model metadata specified in the EBC template to the ML framework.

4. The apparatus of claim 3, wherein, in order to develop the ML model, the ML framework imports a library corresponding to the framework metadata from the EBC framework, receives the dataset metadata from the EBC framework, loads a corresponding dataset, performs preprocessing on the dataset, receives the training and model data from the EBC framework, develops the ML model through model architecture definition, compiling, and learning, stores the developed ML model, and transmits the developed ML model metadata as the EBC item of the EBC framework.

5. The apparatus of claim 1, wherein, when an EBC user selects an EBC item including a specific ML model from the EBC storage, the EBC framework builds an equipment instance model for the EBC item.

6. The apparatus of claim 5, wherein the EBC framework repeats equipment performance evaluation to select an optimal ML model.

7. The apparatus of claim 1, wherein the EBC framework builds an equipment instance model by receiving an EBC item including a specific ML model specified in the EBC storage, which is selected by an EBC user, and executes an embedded ML model on the equipment instance model through an interface of the ML framework.

8. The apparatus of claim 7, wherein, in order to execute the embedded ML model on the equipment instance model, the EBC framework transmits ML model metadata specified in the equipment instance model and data input and output specifications to the ML framework, and
the ML framework loads the stored ML model, performs inference using the imported ML model, and transmits inference result metadata to the equipment instance model.

9. The apparatus of claim 1, wherein an EBC template and one or more EBC items that are generated using the EBC template are stored in the EBC storage.

10. The apparatus of claim 1, wherein the ML framework performs a function for simplifying the generation, learning, evaluation, and application of the ML models and supporting a developer to more easily configure and manage the models.

11. The apparatus of claim 1, wherein ML models for equipment elements developed by an EBC provider and EBC items for each ML model are registered in the EBC storage.

12. The apparatus of claim 1, wherein, in the equipment instance model, a communication protocol is specified to facilitate data exchange between ML frameworks, wherein the communication protocol includes error handling and reporting, security and access control, and monitoring and maintenance functions.

13. The apparatus of claim 1, wherein the EBC framework develops a new ML model through retraining, fine-tuning, or data preprocessing improvement of the ML models through an interface with the ML framework.

14. A method of interfacing an equipment behavior catalogue (EBC) framework with a machine learning (ML) framework, the method comprising:
transmitting, by an EBC framework of an apparatus for interfacing the EBC framework with an ML framework, the ML framework and library metadata that are specified in the EBC template to a corresponding ML framework in order to develop ML models, wherein the apparatus includes an EBC framework including an EBC storage and a set of equipment instance models and an ML framework interfaced with the EBC framework and including a collection of tools and libraries that support the development and learning of ML models;
transmitting, by the EBC framework, dataset metadata and preprocessing metadata specified in the EBC template to the ML framework; and
transmitting, by the EBC framework, training and model metadata specified in the EBC template to the ML framework.

15. The method of claim 14, wherein the EBC framework builds an equipment instance model by receiving an EBC item including a specific ML model specified in the EBC storage, which is selected by an EBC user, and executes an embedded ML model on the equipment instance model through an interface of the ML framework.

16. The method of claim 15, wherein, in order to execute the embedded ML model on the equipment instance model, the EBC framework transmits ML model metadata specified in the equipment instance model and data input and output specifications to the ML framework, and
the ML framework loads the stored ML model, performs inference using the imported ML model, and transmits inference result metadata to the equipment instance model.

17. The method of claim 14, wherein, when an EBC user selects an EBC item including a specific ML model from the EBC storage, the EBC framework builds an equipment instance model for the EBC item.

18. The method of claim 14, wherein, in order to develop the ML model, the ML framework imports a library corresponding to the framework metadata from the EBC framework, receives the dataset metadata from the EBC framework, loads a corresponding dataset, performs preprocessing on the dataset, receives the training and model data from the EBC framework, develops the ML model through model architecture definition, compiling, and learning, stores the developed ML model, and transmits the developed ML model metadata as the EBC item of the EBC framework.

19. The method of claim 14, wherein, in the equipment instance model, a communication protocol is specified to facilitate data exchange between ML frameworks, wherein the communication protocol includes error handling and reporting, security and access control, and monitoring and maintenance functions.

20. The method of claim 14, wherein the EBC framework develops a new ML model through retraining, fine-tuning, or data preprocessing improvement of the ML models through an interface with the ML framework.

* * * * *